(12) United States Patent
Canard et al.

(10) Patent No.: US 8,516,247 B2
(45) Date of Patent: Aug. 20, 2013

(54) GROUP SIGNATURE WITH LOCAL REVOCATION VERIFICATION WITH CAPACITY FOR LIFTING ANONYMITY

(75) Inventors: Sébastien Canard, Caen (FR); Cécile Delerablée, Paris (FR)

(73) Assignee: France Telecom, Paris (FR)

( * ) Notice: Subject to any disclaimer, the term of this patent is extended or adjusted under 35 U.S.C. 154(b) by 234 days.

(21) Appl. No.: 13/142,465

(22) PCT Filed: Dec. 16, 2009

(86) PCT No.: PCT/FR2009/052562
§ 371 (c)(1),
(2), (4) Date: Jun. 28, 2011

(87) PCT Pub. No.: WO2010/076498
PCT Pub. Date: Jul. 8, 2010

(65) Prior Publication Data
US 2012/0017083 A1  Jan. 19, 2012

(30) Foreign Application Priority Data

Dec. 30, 2008 (FR) ...................... 08 59109

(51) Int. Cl.
*H04L 29/06* (2006.01)
(52) U.S. Cl.
USPC ....................................... 713/158
(58) Field of Classification Search
USPC ....................................... 713/158
See application file for complete search history.

(56) References Cited

U.S. PATENT DOCUMENTS

| 4,995,082 | A | 2/1991 | Schnorr | |
|---|---|---|---|---|
| 8,074,073 | B2* | 12/2011 | Gentry | ........................ 713/170 |
| 2004/0186999 | A1* | 9/2004 | Kim et al. | ...................... 713/171 |
| 2005/0157874 | A1* | 7/2005 | Bresson et al. | ................. 380/30 |
| 2009/0225986 | A1* | 9/2009 | Gennaro et al. | .............. 380/278 |

OTHER PUBLICATIONS

Boneh et al., "Short Group Signatures," Advances in Cryptology, CRYPTO 2004, Springer-Verlag, pp. 1-19 (May 2004).

(Continued)

*Primary Examiner* — Edan Orgad
*Assistant Examiner* — Gita Faramarzi
(74) *Attorney, Agent, or Firm* — Drinker Biddle & Reath LLP

(57) ABSTRACT

The cryptographic scheme subdivides time into periods with an index $j=0, 1, 2$, etc. A public key indicates elements u and v of a first cyclic group $G_1$ of prime order p and, for each period j, an integer $s_j$ between 0 and p−1 and elements $g_{1,j}$ of the group $G_1$ and $g_{2,j}$, $w_j$ and $h_j$ of another cyclic group $G_2$ of order p. The private key of a member of the group indicates an integer $x_i$ between 0 and p−1 and, for each period j, an element $A_{i,j}$ of the group $G_1$ such that $A_{i,n}=[A_{i,n-1}/g_{1,n-1}]^{1/(x_i-s_n)}$ for $1 \leq n \leq j$. To sign a message during a period $j \geq 0$, the member selects two integers $\alpha$ and $\beta$ between 0 and p−1, calculates $T_1=u^\alpha$, $T_2=A_{i,j} \cdot v^\alpha$, $S_1=g_{2,j}^\beta$ and $S_2=e(A_{i,j}, h_j)^\beta$ where $e(.,.)$ is a bilinear map of $G_1 \times G_2$ onto $G_T$, and determines according to the message the data that justify the fact that the elements $T_1, T_2, S_1$ and $S_2$ are correctly formed with knowledge of the private key of the member for the period with index j.

19 Claims, 5 Drawing Sheets

(56) References Cited

OTHER PUBLICATIONS

Boneh et al., "Group Signatures with Verifier-Local Revocation," Proceedings of the 11th ACM Conference on Computer and Communications Security, Washington, DC, USA, Oct. 25-29, 2004, pp. 168-177 (Oct. 25, 2004).

Girault et al., "On the Fly Authentication and Signature Schemes Based on Groups of Unknown Order," Journal of Cryptology, vol. 19, pp. 463-487 (2006).

Li et al., "Key-Insulated Group Signature Scheme with Verifier-Local Revocation," Eighth ACIS International Conference on Software Engineering, Artificial Intelligence, Networking, and Parallel/Distributing Computing, 2007, SNPD 2007, IEEE, Piscataway, NJ, USA, pp. 273-278 (Jul. 1, 2007).

Nakanishi et al., "Verifier-Local Revocation Group Signature Schemes with Backward Unlinkability from Bilinear Maps," IEICE Transactions on Fundamentals of Electronics, Communications and Computer Sciences, Engineering Sciences Society, Tokyo JP, vol. E90A (1), pp. 65-74 (Jan. 1, 2007).

Nakanishi et al., "A Short Verifier-Local Revocation Group Signature Scheme with Backward Unlinkability," IEICE Trans. Fundamentals, vol. E90-A (9), pp. 1793-1802 (Sep. 2007).

Ren et al., "Efficient User Revocation for Privacy-aware PKI," The Fifth International ICST Conference on Heterogeneous Networking for Quality, Reliability, Security and Robustness (QSHINE 2008), retrieved from internet website: web.njit.edu/wins/files/ren-Qshine08.pdf, pp. 1-7 (Jul. 31, 2008).

Schnorr, "Efficient Identification and Signatures for Smart Cards," Frankfort University, Springer-Verlag, pp. 239-252 (1998).

Zhang et al., "More Efficient VLP Group Signature Satisfying Exculpability," IEICE Trans. Fundamentals, vol. E91-A (7), pp. 1831-1835 (Jul. 2008).

Zhou et al., "Shorter Verifier-Local Revocation Group Signatures From Bilinear Maps," Lecture Notes in Computer Science, Cryptology and Network Security, vol. 4301, pp. 126-143 (2006).

Zhou et al., "A Shorter Group Signature with Verifier-Location Revocation and Backward Unlinkability," retrieved from internet website: http://eprint.iacr.org/2006/100, pp. 1-13 (Sep. 23, 2006).

\* cited by examiner

GROUP SIGNATURE WITH LOCAL REVOCATION VERIFICATION WITH CAPACITY FOR LIFTING ANONYMITY

CROSS-REFERENCE TO RELATED APPLICATIONS

This application is the U.S. national phase of the International Patent Application No. PCT/FR2009/052562 filed Dec. 16, 2009, which claims the benefit of French Application No. 08 59109 filed Dec. 30, 2008, the entire content of which is incorporated herein by reference.

FIELD OF THE INVENTION

This invention relates to a cryptographic method, and in particular to the Verifier-Local Revocation (VLR) group signature techniques.

BACKGROUND

A group signature scheme allows members to sign messages anonymously on behalf of the group. A person examining the signature can then obtain the assurance that the signer is a member of the group, without being able to identify which member it is. It is often implemented so that an authorized authority remains able to lift the anonymity of any signature when needed.

To allow revocation of a group member, the scheme must also have mechanisms to prevent a member from signing after such a revocation. Two main techniques exist:
- one which requires updating the keys of all non-revoked members and updating the public key for the system,
- the other which requires the verifier to test whether or not a given signature was generated from a revoked key. A revocation list then contains elements characterizing the set of these revoked keys.

In certain contexts, it is undesirable to require the users to connect regularly to the database of public elements in order to update their keys, as this operation can be costly in terms of computation.

The second technique, called group signature with verifier-local revocation (VLR), is considered here. It typically makes use of algorithms having the following functionalities:
- generation of keys, namely a public key shared by all protagonists of the scheme, respective private keys of the various members of the signer group, a secret key of the group manager, and a secret key of the revocation manager;
- signature, allowing each member having a private key to sign anonymously for the group;
- revocation, allowing a revocation manager to add a member to the list of revoked members;
- signature verification, allowing anyone having the public key to ensure that a given signature does indeed come from a non-revoked member of the signer group (without being able to determine which member);
- opening a signature . . . .

A VLR technique for group signature that does not have the ability to lift anonymity was introduced by Boneh and Shacham in "Group Signatures with Verifier-Local Revocation", Proceedings of the 11$^{th}$ ACM Conference on Computer and Communications Security, Washington D.C., USA, ACM, 2004, pp. 168-177. Aside from the inability to lift anonymity, which is a desirable property in many cases, this system has the limitation of not maintaining the anonymity of prior signatures (backward unlinkability). This property of maintaining anonymity ensures that revoking a member does not compromise the anonymity of all previous signatures of this member. This property is often desirable, particularly when the revoked member is honest.

In "Verifier-Local Revocation Group Signature Schemes with Backward Unlinkability from Bilinear Maps", IEICE Transactions on Fundamentals of Electronics, Communications and Computer Sciences, 2007, E90-A(1), pp. 65-74, Nakanishi and Funabiki proposed a variation in which time is divided into a number of periods with the number being fixed at system creation. Each period has a corresponding element in the public key of the system (necessary to produce a signature), and to each revoked member there corresponds as many elements in the revocation list as there are periods. This technique, which also does not include the lifting of anonymity, has the disadvantage that a revoked key can continue to be used to produce group signatures as long as the current period has not ended. It is therefore necessary to compromise between the length of a period and the size of the public elements and revocation list.

There is no current technique that provides a strong secrecy preservation property, in which an adversary accessing the private key of a member of the signer group is unable to determine which signatures were made by this member.

In "Shorter Verifier-Local Revocation Group Signatures From Bilinear Maps" (Lecture Notes in Computer Science, Cryptology and Network Security, Volume 4301, 2006, pp. 126-143), Zhou and Lin presented a VLR group signature scheme allowing the lifting of anonymity. An anonymity lifting manager, which holds a secret key, is then able to partially reveal the private key of the member who signed a given message. The mechanism for opening or lifting anonymity in this article requires an exhaustive search among the members of the group, making this an unattractive system.

SUMMARY

The present invention aims to offer a cryptographic system having the property of strong secrecy preservation. In addition, it aims to authorize revocations within a constant period of time without subsequently allowing identification of the signatures of the revoked member.

A cryptographic method is proposed which uses a cryptographic scheme based on cyclic groups $G_1$, $G_2$ and $G_T$ of order p, two respective generator elements $g_1$ and $g_2$ of the groups $G_1$ and $G_2$, and a bilinear map $e(.,.)$ of $G_1 \times G_2$ onto $G_T$, where p indicates a prime number. In this method, time is subdivided into successive periods of index $j=0, 1, 2$, etc. A public key has components representative of elements u and v of the group $G_1$ and, for each period of index j, components representative of an integer $s_j$ between 0 and p−1, of an element $g_{1,j}$ of the group $G_1$, and of elements $g_{2,j}$, $w_j$ and $h_j$ of the group $G_2$. A first secret key includes an integer $\gamma$ between 0 and p−1 such that $w_j = g_{2,j}^\gamma$, $g_{1,0} = g_1^{1/(\gamma+s_0)}$, $g_{2,0} = g_2^{1/(\gamma+s_0)}$ and, for $j>0$, $g_{1,j} = g_{1,j-1}^{1/(\gamma+s_j)}$ and $g_{2,j} = g_{2,j-1}^{1/(\gamma+s_j)}$. A second secret key includes an integer ok between 0 and p−1 such that $v = u^{ok}$. A third secret key includes an integer tk between 0 and p−1 such that $h_j = g_{2,j}^{tk}$. Each member of a signer group has a private key with a component representative of an integer $x_i$ between 0 and p−1 and, for each period of index j, a component representative of an element $A_{i,j}$ of the group $G_1$ such that $A_{i,n} = [A_{i,n-1}/g_{1,n-1}]^{1/(x_i-s_n)}$ for any index n between 1 and j.

The cryptographic method comprises a signature procedure in which said member of the signer group obtains a signature for a message during a period of index $j \geq 0$, by executing the steps of:

choosing two integers α and β between 0 and p−1;
calculating elements $T_1=u^\alpha$ and $T_2=A_{i,j}\cdot v^\alpha$ of the group $G_1$;
calculating an element $S_1=g_{2,j}^{\ \beta}$ of the group $G_2$;
calculating an element $S_2=e(A_{i,j}, h_j)^\beta$ of the group $G_T$;
calculating proof data as a function of the message, to confirm that the elements $T_1$, $T_2$, $S_1$ and $S_2$ are correctly formed with knowledge of the private key of the member of the signer group for the period of index j; and
including the elements $T_1$, $T_2$, $S_1$, $S_2$ and the proof data into the signature of the message.

In an embodiment, the element $A_{i,0}$ of the group $G_1$ is equal to $g_1^{1/(\gamma+x_i)}$.

In another embodiment, a procedure is provided for registering members with a supervisory authority holding the first secret key. The private key of a member of a signer group then has components representative (1) of $x_i$, (2) of another integer $y_i$ between 0 and p−1 which is only known to the member who is being registered, and (3) of $A_{i,j}$ where $A_{i,0}=g_1^{1/(\gamma+x_i)}\cdot v^{y_i/(\gamma+x_i)}$.

The third secret key is used for member revocation from the signer group. The cryptographic method can thus comprise a procedure for the revocation of members from the signer group by an authority holding the third secret key and maintaining an updated revocation list applicable to a current period and containing k−1 elements of the group $G_1$ after revocation of k−1 members of the signer group, where k is an integer at least equal to 1. The revocation during a period of index j' of a $k^{th}$ member of the signer group for whom the private key contains an element $A_{i(k),j'}$ of the group $G_1$ for the period of index j' then comprises adding an element grt[i(k), j']=$A_{i(k),j'}^{tk}$ of the group $G_1$ to the revocation list applicable to the period of index j'.

A procedure can additionally be provided for the modification of the revocation list by an authority holding the first secret key, to be executed at each change of period in the time subdivision. The revocation list modification when advancing from a period of index j"−1 to the next period of index j" for an integer j"≧1 then comprises, for any element grt[i(l), j"−1] of the group $G_1$ belonging to the revocation list applicable to the period of index j"−1, including the element grt[i(l), j"]=grt[i(l), j"−1]$^{1/(\gamma+s_{j''})}$ of the group $G_1$ into the revocation list applicable to the next period of index j".

Using such revocation lists, a signature verification procedure can be applied by an entity holding the public key. The verification of a signature, including the elements $T_1$, $T_2$ of the group $G_1$ and $S_1$, $S_2$ of the group $G_2$ and proof data, attached to a message and presumed to be obtained during a period of index j, takes into account the revocation list applicable to the period of index j and comprises the steps of:
determining that the signature comes from a member of the signer group if the proof data confirm that the elements $T_1$, $T_2$, $S_1$ and $S_2$ are correctly formed as a function of the message with knowledge of a private key valid for the period of index j; and
accepting the signature as coming from a non-revoked member of the signer group if $e(grt[i(l), j], S_1) \neq S_2$ for any element grt[i(l), j] of the revocation list applicable to the period of index j.

The second secret key is used to allow anonymity lifting. The cryptographic method can thus comprise a procedure for an authority holding the second secret key to lift the anonymity of the signer (also referred to as the signatory) of a message, the anonymity lifting based on a signature of the message, including the elements $T_1$, $T_2$ of the group $G_1$, comprising calculating the element $A=T_2\cdot T_1^{-ok}$ of the group $G_1$.

Another aspect of the invention relates to a cryptographic device for implementing the above method, using a cryptographic scheme based on cyclic groups $G_1$, $G_2$ and $G_T$ of order p, two respective generating elements $g_1$ and $g_2$ of the groups $G_1$ and $G_2$, and a bilinear map e(., .) of $G_1 \times G_2$ onto $G_T$, where p indicates a prime number, time being subdivided into successive periods of index j=0, 1, 2, etc. A public key ($gpk_j$) has components representative of elements u and v of the group $G_1$ and, for each period of index j, components representative of an integer $s_j$ between 0 and p−1, of an element $g_{1,j}$ of the group $G_1$, and of elements $g_{2,j}$, $w_j$ and $h_j$ of the group $G_2$. A private key of a member of a signer group possessing the cryptographic device has a component representative of an integer $x_i$ between 0 and p−1 and, for each period of index j, a component representative of an element $A_{i,j}$ of the group $G_1$ such that $A_{i,n}=[A_{i,n-1}/g_{1,n-1}]^{1/(x_i-s_n)}$ for any index n between 1 and j. The cryptographic device comprises a calculator for obtaining a signature for a message during a period of index j≧0, by selecting two integers α and β between 0 and p−1, and calculating elements $T_1=u^\alpha$ and $T_2=A_{i,j}\cdot v^\alpha$ of the group $G_1$, an element $S_1=g_{2,j}^{\ \beta}$ of the group $G_2$, an element $S_2=e(A_{i,j}, h_j)^\beta$ of the group $G_T$ and, as a function of the message, proof data confirming that the elements $T_1$, $T_2$, $S_1$ and $S_2$ are correctly formed with knowledge of the private key of the member of the signer group for the period of index j, the signature of the message including the elements $T_1$, $T_2$, $S_1$, $S_2$ and the proof data.

Yet another aspect of the invention relates to a cryptographic unit using a cryptographic scheme as presented above and comprising a revocation list manager for maintaining an updated revocation list applicable to a current period using a secret key, i.e. the third secret key. The revocation list manager comprises a calculator for receiving, during a period of index j', a revocation list containing k−1≧0 elements of the group $G_1$ and a revocation request for a $k^{th}$ member of the signer group for whom the private key contains an element $A_{i(k),j'}$ of the group $G_1$ for the period of index j', k being an integer at least equal to 1, and for producing an updated revocation list applicable to the period of index j', to which has been added the element grt[i(k), j']=$A_{i(k),j'}^{tk}$ of the group $G_1$.

Yet another aspect of the invention relates to a cryptographic unit using a cryptographic scheme as presented above and comprising another revocation list manager for forming a revocation list applicable to a new period of index j" using a secret key, i.e. the first secret key, and based on a revocation list applicable to the previous period of index j"−1, where j" is an integer at least equal to 1. The revocation list applicable to the new period of index j" comprises a respective element grt[i(l), j"]=grt[i(l), j"−1]$^{1/(\gamma+s_{j''})}$ of the group $G_1$ for any element grt[i(l), j"−1] of the group $G_1$ belonging to the revocation list applicable to the previous period of index j"−1.

Yet another aspect of the invention relates to a verification device for verifying the signatures produced using a cryptographic scheme as presented above. This verification device has access to the public key for a period of index j as well as to a revocation list applicable to the period of index j and composed of k elements grt[i(l), j] of the group $G_1$, where k is a positive integer or zero. It comprises a calculator for receiving a signature attached to a message and presumed to be obtained during a period of index j, the signature including elements $T_1$, $T_2$ of the group $G_1$ and $S_1$, $S_2$ of the group $G_2$ and proof data, for determining that said signature comes from a member of the signer group if the proof data confirm that the elements $T_1$, $T_2$, $S_1$ and $S_2$ are correctly formed as a function of the message with knowledge of a private key valid for the period of index j, and for accepting the signature as coming from a non-revoked member of the signer group if $e(grt[i(l), j], S_1) \neq S_2$ for any element $grt[i(l), j]$ of the revocation list applicable to the period of index j.

Yet another aspect of the invention relates to a cryptographic unit using a cryptographic scheme as presented above and comprising an anonymity lifting server using a secret key, i.e. the second secret key, for receiving a signature for a message, including the elements $T_1$, $T_2$ of the group $G_1$, and producing the element $A=T_2 \cdot T_1^{-ok}$ of the group $G_1$.

Other aspects of the invention propose computer programs for the cryptographic devices and units as defined above. These programs comprise instructions for executing the steps of the signature procedure, the revocation procedure, the revocation list modification procedure, the signature verification procedure, and the anonymity lifting procedure of the cryptographic methods, during their execution by a processing unit of the cryptographic device or unit.

BRIEF DESCRIPTION OF THE DRAWINGS

Other features and advantages of the invention will become apparent from reading the following description of some non-limiting exemplary embodiments, with reference to the attached drawings in which.

DETAILED DESCRIPTION

Figure 1:
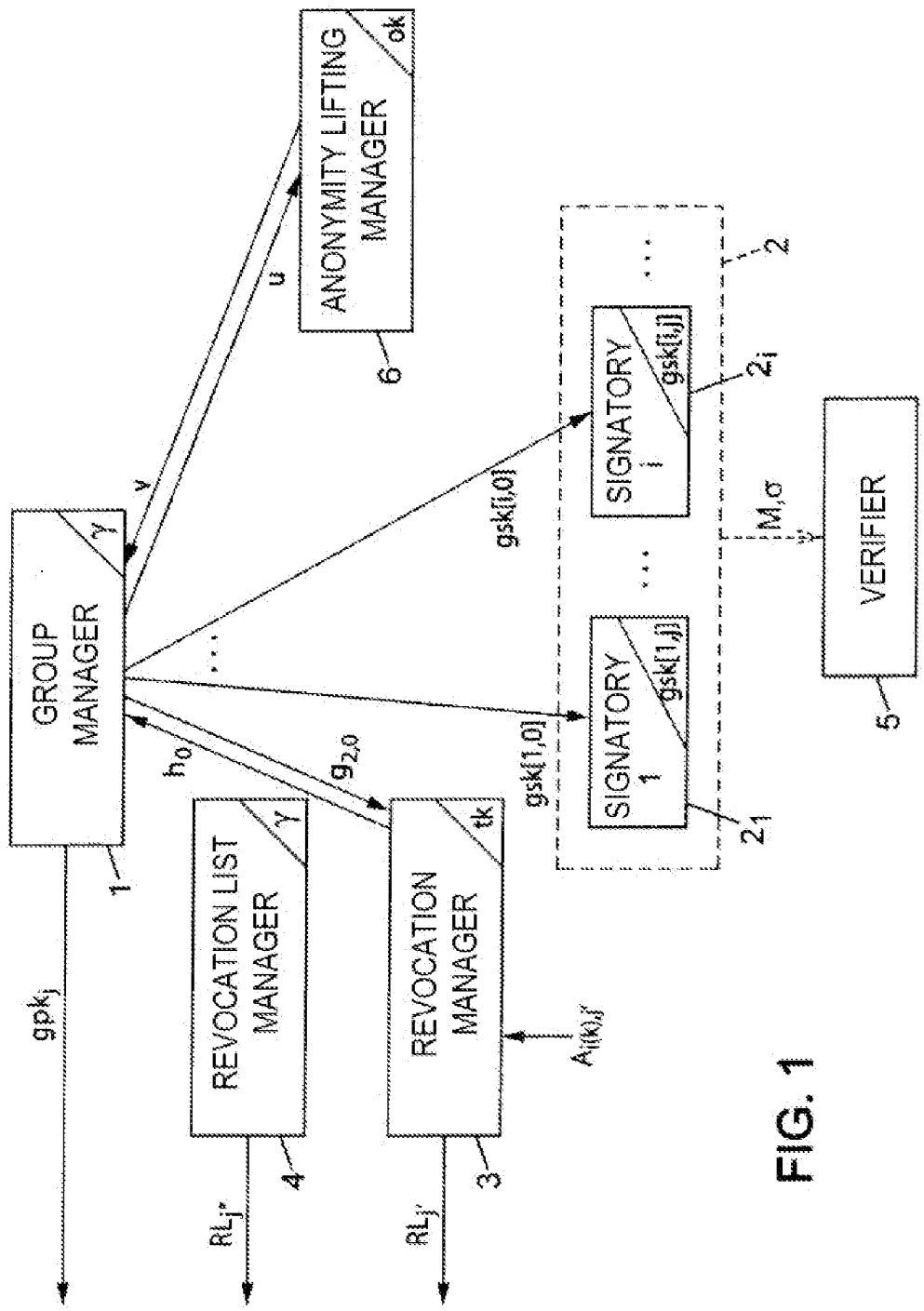
FIG. 1 is a block diagram illustrating the entities involved in a VLR group signature method having a capacity for lifting anonymity.

The cryptographic method illustrated in FIG. 1 involves four authorities which, in the example illustrated, use four distinct cryptographic units 1, 3, 4 and 6:
- a supervisory authority for one or more signer groups, for which unit 1 incorporates a group manager storing a base key γ in a secret manner;
- an membership revocation authority for one or more signer groups, for which unit 3 incorporates a revocation manager storing a revocation key tk in a secret manner;
- an authority for updating revocation lists, for which unit 4 incorporates a revocation list manager storing the base key γ in a secret manner;
- an authority for lifting the anonymity of message signers, for which unit 6 incorporates a anonymity lifting server storing an anonymity lifting key ok in a secret manner.

In practice, several of these authorities can be collocated in one unit. Typically, the authorities for supervising the groups and updating the revocation lists belong to the same unit so that the key γ is only stored in one location. The four units 1, 3, 4, 6 represented in FIG. 1 could even be a single unit.

FIG. 1 also shows a signer group 2 having signatory members who possess cryptographic devices $2_1, \ldots, 2_i, \ldots$ which each store a respective private key $gsk[1, j], \ldots, gsk[i, j], \ldots$. The private keys $gsk[i, j]$ of the users are indexed by an integer j which denotes successive periods of time incorporated in the cryptographic scheme (j=0, 1, 2, etc.).

One or more devices 5 having access only to the public parameters are able to verify the signatures σ attached to messages M by members of the group 2. The verification concerns the validity of the signature and the non-revocation of its author.

The group manager 1 is responsible for generating and publishing the public key $gpk_j$ related to each period of index j in the time subdivision. If it is implemented in the same unit as the revocation authority 3 and the anonymity lifting authority 6, the group manager 1 also generates the secret keys tk and ok for the membership revocation and anonymity lifting authorities. The group manager 1 then generates the respective private keys $gsk[1, 0], \ldots, gsk[i, 0], \ldots$ for the members of the group for the period of index j=0 and distributes them to these members.

The cryptographic scheme employed refers to three cyclic groups $G_1$, $G_2$ and $G_T$ (two or three of them can be the same). The cyclic groups $G_1$, $G_2$ and $G_T$ are of prime order p. The respective generator elements for the groups $G_1$ and $G_2$ are denoted as $g_1$ and $g_2$, connected to each other by an isomorphism ψ ($g_1 = \psi(g_2)$). The scheme also uses a bilinear map $e(.,.)$ of $G_1 \times G_2$ onto $G_T$. Bilinear is understood to mean that for any pair of integers (a, b), any element $u_1$ of $G_1$, and any element $u_2$ of $G_2$, we have $e(u_1^a, u_2^b) = e(u_1, u_2)^{ab}$. One of the possible examples of this bilinear map $e(.,.)$ is the Tate pairing.

Figure 2:
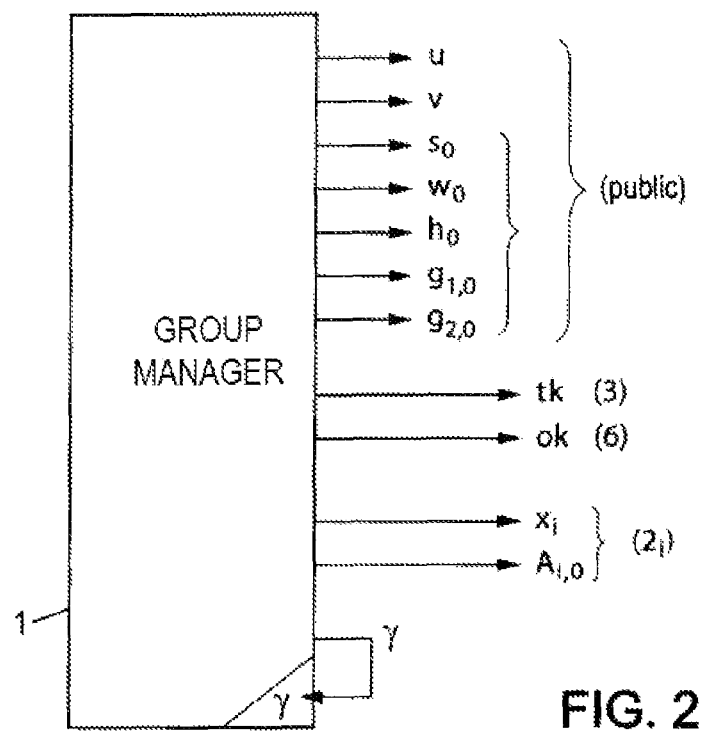
FIGS. 2 to 9 are diagrams illustrating the inputs and outputs of these entities in different phases of the cryptographic method.

FIG. 2 illustrates an example of the initial generation of keys by the group manager 1. The group manager 1 chooses element $g_2$ in the group $G_2$ and takes $g_1 = \psi(g_2)$. It also chooses (for example randomly) the integer γ between 0 and p−1 to form the base key which it keeps secret.

To generate the public key $gpk_0 = (u, v, s_0, w_0, h_0, g_{1,0}, g_{2,0})$, relative to the period of index j=0, the group manager 1 also chooses (for example randomly) an element u in the group $G_1$ and an integer $s_0$ between 0 and p−1. It calculates the elements $g_{1,0}$ of the group $G_1$ and $g_{2,0}$, $w_0$ of the group $G_2$ as follows:

$$g_{1,0} = g_1^{1/(\gamma+s_0)}$$

$$g_{2,0} = g_2^{1/(\gamma+s_0)}$$

$$w_0 = g_{2,0}^{\gamma}$$

The group manager 1 sends the element $g_{2,0}$ to the membership revocation authority 3 so that the authority can calculate the element $h_0$ of the group $G_2$ as follows:

$$h_0 = g_{2,0}^{tk}$$

after having randomly selected the integer tk between 0 and p−1. The revocation authority 3 stores its key tk in a secret manner and returns the element $h_0$ to the group manager 1 for publishing the public key $gpk_0$.

The group manager 1 also sends the element u to the anonymity lifting authority 6 so that said authority can calculate the element v of the group $G_1$ as follows:

$$v = u^{ok}$$

after randomly selecting the integer ok between 0 and p−1. The anonymity lifting authority 6 stores its key ok in a secret manner and returns the element v to the group manager 1 for publishing the public key $gpk_0$.

Figure 3:
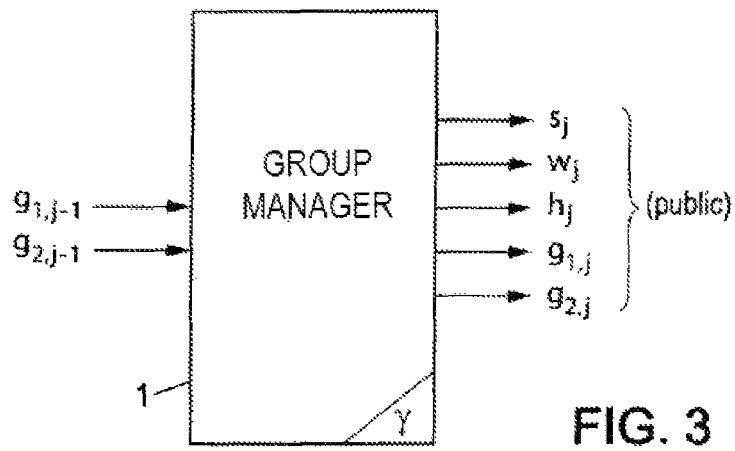

The parameters u and v of the public key $gpk_0$ are permanent, while the other parameters $s_0, w_0, h_0, g_{1,0}$ and $g_{2,0}$ will be updated at each new period of index j>0. To do this (FIG. 3), the group manager 1 selects a new integer $s_j$ between 0 and p−1 then calculates the elements $g_{1,j}$ of the group $G_1$ and $g_{2,j}$, $w_j$ and $h_j$ of the group $G_2$ as follows:

$$g_{1,j} = g_{1,j-1}^{1/(\gamma+s_j)}$$

$$g_{2,j} = g_{2,j-1}^{1/(\gamma+s_j)}$$

$$w_j = g_{2,j}^{\gamma}$$

$$h_j = g_{2,j}^{tk}$$

The new public key for the period of index j is then $gpk_j = (u, v, s_j, w_j, h_j, g_{1,j}, g_{2,j})$. The periods j can be of any duration. This is for example decided by the group manager 1.

To generate the private key $gsk[i, 0] = (x_i, A_{i,0})$ for a member i relative to the period of index j=0, the group manager 1 selects (for example randomly) an integer $x_i$ between 0 and p−1 and calculates the element $A_{i,0} = g_1^{1/(\gamma+x_i)}$ of the group $G_1$. For each period of index j>0, the private key becomes $gsk[i, j] = (x_i, A_{i,j})$, where the element $A_{i,j}$ of the group $G_1$ is given by:

$$A_{i,j} = [A_{i,j-1}/g_{1,j-1}]^{1/(x_i - s_j)} \quad (1)$$

Figure 4:
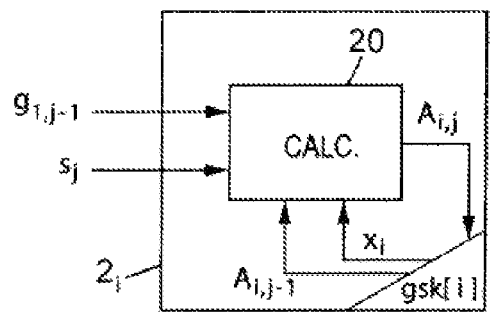

After distribution of the initial key $gsk[i, 0] = (x_i, A_{i,0})$, the cryptographic device $\mathbf{2}_i$ for the member having successive public keys $gpk_0, \ldots, gpk_j$ (or at least $g_{1,0}, \ldots, g_{1,j-1}$ and $s_1, \ldots, s_j$) is thus able to obtain his private key $gsk[i, j] = (x_i, A_{i,j})$ for any period of index j, by the process illustrated in FIG. 4 where the calculator 20 applies the recursion $A_{i,n} = [A_{i,n-1}/g_{1,n-1}]^{1/(x_i - s_n)}$ to each new period with an integer index $n \geq 1$ up to j.

Figure 5:
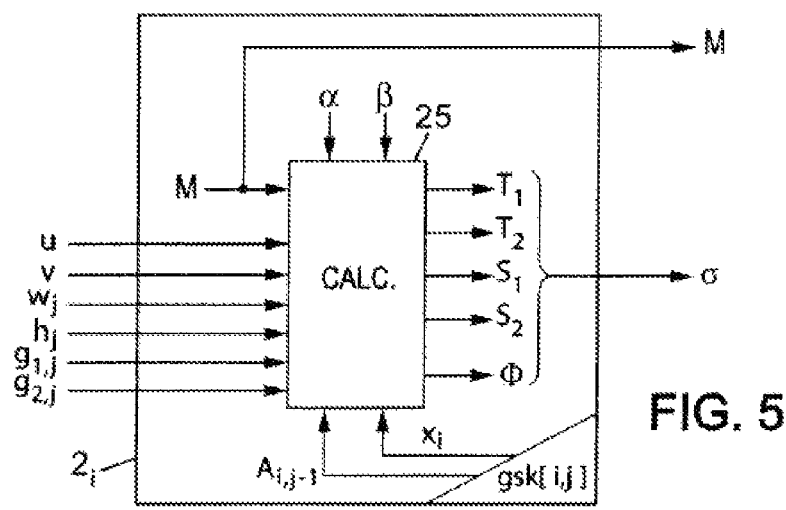

The signature of a message M, generated locally in the cryptographic device $\mathbf{2}_i$ of a member or received from the outside, can take place as illustrated in FIG. 5. First, the calculator 25 for the device $\mathbf{2}_i$ finds a value for the element $A_{i,j}$ of the private key of the signing member relative to the period j in which the signature took place, by a searchable and decodable encryption technique, to produce a cryptogram $(T_1, T_2, S_1, S_2)$. Then the calculator 25 calculates proof data $\Phi$ as a function of the message M to prove that the cryptogram $(T_1, T_2, S_1, S_2)$ is correctly formed with knowledge of the private key $gsk[i, j] = (x_i, A_{i,j})$ of the member for the signature period of index j. The proof data $\Phi$ advantageously consist of a zero-knowledge proof of knowledge (ZKPOK).

The cryptogram $(T_1, T_2, S_1, S_2)$ is composed of two elements $T_1, T_2$ of the group $G_1$, an element $S_1$ of the group $G_2$, and an element $S_2$ of the group $G_T$, which the cryptographic device $\mathbf{2}_i$ calculates after having randomly selected two integers $\alpha$ and $\beta$ between 0 and p−1, as follows:

$$T_1 = u^\alpha$$

$$T_2 = A_{i,j} \cdot v^\alpha$$

$$S_1 = g_{2,j}^\beta$$

$$S_2 = e(A_{i,j}, h_j)^\beta$$

The ZKPOK serving as proof data $\Phi$ can be established in various ways which are well known in cryptographic techniques (for example, see "On the Fly Authentication and Signature Schemes Based on Groups of Unknown Order", M. Girault, G. Poupard, J. Stern, Journal of Cryptology, Vol. 19, pp. 463-487, 2006; or "Efficient Identification and Signatures for Smart Cards", K. P. Schnorr, Crypto '89, Vol. 435, Lecture Notes in Computer Science, pp. 239-252, Springer, 1989). In particular, the ZKPOK $\Phi$ may prove knowledge of the quintuplet $(x_i, z, \alpha, \beta, \delta)$, where $z = x_i \cdot \alpha$ and $\delta = \alpha \cdot \beta$, such that:

$$T_1 = u^\alpha$$

$$e(T_2, g_{2,j})^{x_i} \cdot e(v, w_j)^{-\alpha} \cdot e(v, g_{2,j})^{-z} = e(g_{1,j}, g_{2,j})/e(T_2, w_j)$$

$$T_1^\beta = u^\delta$$

$$S_1 = g_{2,j}^\beta$$

$$e(T_2, h_j)^\beta = S_2 \cdot e(v, h_j)^\delta$$

One of the possible examples consists of the calculator 25 calculating the ZKPOK in four steps:

(E1) randomly selecting integers $r_{x_i}, r_z, r_\alpha, r_\beta$ and $r_\delta$ between 0 and p−1;

(E2) calculating the following elements:

$$t_1 = u^{r_\alpha}$$

$$t_2 = e(T_2, g_{2,j})^{r_{x_i}} \cdot e(v, w_j)^{-r_\alpha} \cdot e(v, g_{2,j})^{-r_z}$$

$$t_3 = T_1^{r_\beta} / u^{r_\delta}$$

$$t_4 = g_{2,j}^{r_\beta}$$

$$t_5 = e(T_2, h_j)^{r_\beta} / e(v, h_j)^{r_\delta}$$

(E3) calculating a digest c by applying a hash function $\mathcal{H}$ to the concatenation of the elements $T_1, T_2, S_1, S_2, t_1, t_2, t_3, t_4, t_5$ and of the message M expressed in binary, which is $c = \mathcal{H}(T_1 \| T_2 \| S_1 \| S_2 \| t_1 \| t_2 \| t_3 \| t_4 \| t_5 \| M)$ (E4) calculating the following elements:

$$s_{x_i} = r_{x_i} - c \cdot x_i$$

$$s_z = r_z - c \cdot z$$

$$s_\alpha = r_\alpha - c \cdot \alpha$$

$$s_\beta = r_\beta - c \cdot \beta$$

$$s_\delta = r_\delta - c \cdot \delta$$

The ZKPOK delivered by the calculator 25 of the cryptographic device $\mathbf{2}_i$ is then $\Phi = (c, s_{x_i}, s_z, s_\alpha, s_\beta, s_\delta)$. And the signature $\sigma$ obtained in this manner for the message M is $\sigma = (T_1, T_2, S_1, S_2, \Phi)$.

Figure 9:
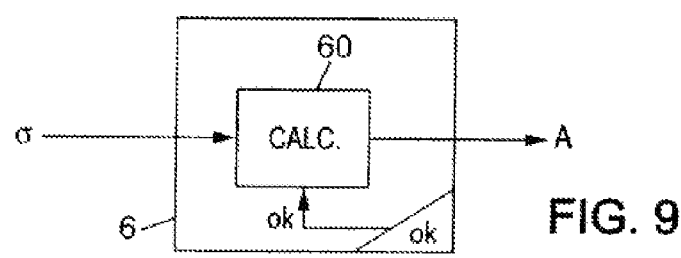

The revocation of a member during a period of index $j' \geq 0$ requires knowing element $A_{i,j'}$ of his private key in effect during the period of index j'. This is performed by the revocation manager 3 to which this element is submitted by the group manager 1, by the anonymity lifting server 6 (which determines it by the process described below with reference to FIG. 9), or by the member i who is to be revoked.

Figure 6:
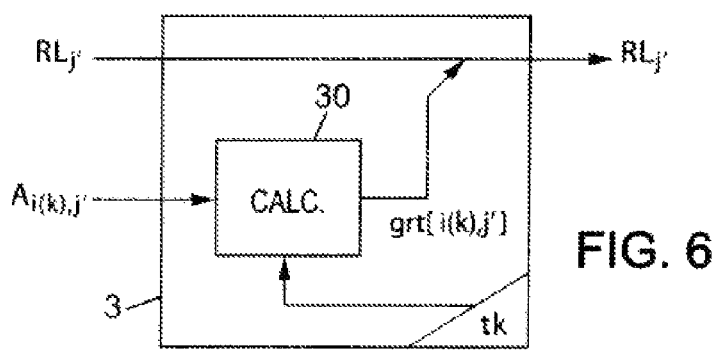

The revocation procedure is illustrated by FIG. 6. It adds an element to a revocation list $RL_{j'}$, composed of a certain number of elements $grt[i(l), j']$ of the group $G_1$. This list is empty when no member has been revoked. The number of members revoked before the current revocation is denoted as k−1 (where k is an integer greater than zero). In the procedure illustrated in FIG. 6, the revocation manager 3 therefore receives a list $RL_{j'}$ of k−1 elements $grt[i(l), j']$ for $l=1, 2, \ldots, k-1$, as well as the element $A_{i,j'}$ of the key to be revoked during the period of index j'. A calculator 30 determines $grt[i(k), j'] = A_{i(k),j'}^{tk}$ and adds it to the list $RL_{j'}$.

The updated list $RL_{j'}$, composed of k elements, is then published by the authority 3 so that each verification device is aware of it.

When there is a change of period, from the index to the index j"−1 to the index j" ($j'' \geq 1$), the group manager makes available a new public key $gpk_{j''}$ as described above. It also signals to the authority which updates the revocation list that a new list $RL_{j''}$ must be formed because of the change of period.

Figure 7:
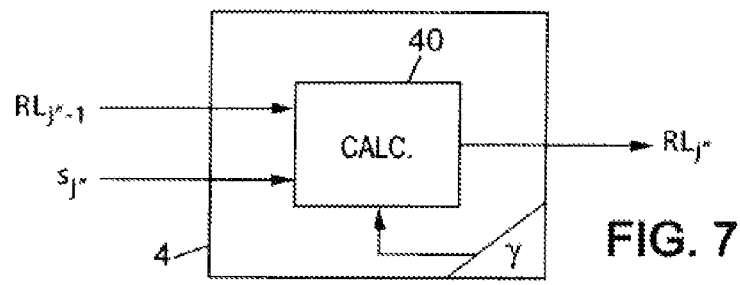

This is done by a calculator 40 of the cryptographic unit 4 as illustrated in FIG. 7. This calculator receives the list $RL_{j''-1}$ which applied during the previous period as well as the number $s_{j''}$ which is part of the new public key $gpk_{j''}$. Each element $grt[i(l), j''-1]$ of the previous list $RL_{j''-1}$ which is replaced with a new element $grt[i(l), j''] = grt[i(l), j''-1]^{1/(\gamma+s_{j''})}$ of the group $G_1$ to form the revocation list $RL_{j''}$.

Figure 8:
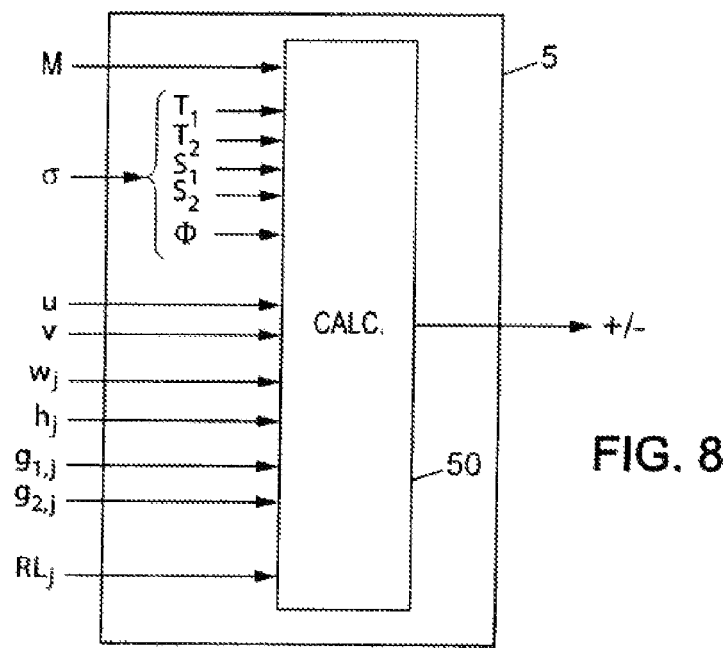

FIG. 8 shows the calculator 50 which will enable a verification device 5 to verify the signature $\sigma$ attached to a message M using the above scheme. In addition to the signed message (M, σ), the calculator 50 has access to the public key $gpk_j=(u, v, s_j, w_j, h_j, g_{1,j}, g_{2,j})$ for the period of index j during which the signature σ is presumed to have been attached as well as the revocation list $RL_j$ which applies for this same period (and if applicable, taking into account the revocations occurring during the current period, after intervention of the revocation manager 3). The index of period j may be attached to the signature σ or deduced from a timestamp on the message M. If not, the public elements which the verifier 5 accesses include the keys $gpk_j$ and the lists $RL_j$ of the different periods up to the current period, so as to scan the indexes j.

In a first step of the verification, the calculator 50 tests the validity of the signature using proof data Φ, which here means seeing whether the proof data Φ confirm that the elements $T_1$, $T_2$, $S_1$ and $S_2$ are correctly formed as a function of the message M with knowledge of a private key gsk[i, j] valid for the period of index j. The signature σ will be recognized as coming from a member of the group 2 if the test is positive. The test uses well-known techniques for ZKPOK such as those described in the publications cited above. If the received ZKPOK $Φ=(c, s_{x_i}, s_z, s_α, s_β, s_δ)$ is calculated by the steps (E1)-(E4) mentioned above, the test can occur in three steps:

(E'1) calculating the following elements:

$$d_1 = T_1^c \cdot u^{s_α}$$

$$d_2 = [e(g_{1,j}, g_{2,j})^c / e(T_2, w_j)] \cdot e(T_2, g_{2,j})^{s_{x_i}} \cdot e(v, w_j)^{-s_α} \cdot e(v, g_{2,j})^{-s_z}$$

$$d_3 = T_1^{s_β} / u^{s_δ}$$

$$d_4 = S_1^c \cdot g_{2,j}^{s_β}$$

$$d_5 = S_2^c \cdot e(T_2, h_j)^{s_β} / e(v, h_j)^{s_δ}$$

(E'2) calculating a digest c' using the hash function $\mathcal{H}$ taking into account the received message M, meaning where $c'=\mathcal{H}(T_1\|T_2\|S_1\|S_2\|d_1\|d_2\|d_3\|d_4\|d_5\|M)$ (E'3) concluding that the test is positive if c'=c, and otherwise negative.

In a second verification step, the calculator 50 examines whether or not a (unidentified) member of the group 2 who has attached a signature σ recognized as valid to the message M has been revoked.

This second step consists of successively considering the elements grt[i(l), j] of the group $G_1$ which appear (if applicable, i.e. if k>0) in the revocation list $RL_j$ for l=1, ..., k, and calculating for each one the element $X_l$ of the group $G_T$ using $X_l=e(grt[i(l), j], S_1)$. If the case where $X_l=S_2$ is encountered, one can conclude that the signature σ comes from the $l^{th}$ member of the group 2 who has been revoked. If $X_l \neq S_2$ for all elements in the revocation list $RL_j$, the signature σ can be accepted as coming from a non-revoked member of the signer group 2.

To permit lifting the anonymity of the message signer under the control of the authority authorized to do so, the anonymity lifting server 6 comprises a calculator 60 to which the signature σ for this message is submitted. It is even sufficient to provide it with the elements $T_1$ and $T_2$ of this signature σ. The anonymity lifting server 60 has access to the key ok, so that the calculator 60 can calculate the element $A=T_2 \cdot T_1^{-ok}$ of the group $G_1$.

It can be verified that this element A, constituting the output from the anonymity lifting server 6, is equal to the element $A_{i,j}$ of the private key of the member who generated the signature σ during the period of index j. By making known this element $A=A_{i,j}$, the group manager 1 is able to reveal who is the signer and if necessary to request his revocation by the manager 3. One will note that only knowing $A=A_{i,j}$ is insufficient for an adversary to sign in place of the signer whose anonymity has been lifted, as the parameter $x_i$ of his private key is not revealed by the server 6.

In the embodiment described above, the element $A_{i,0}$ of the group $G_1$ belonging to the private key of a member i for the period of index j=0 is equal to $g_1^{1/(γ+x_i)}$.

Figure 10:
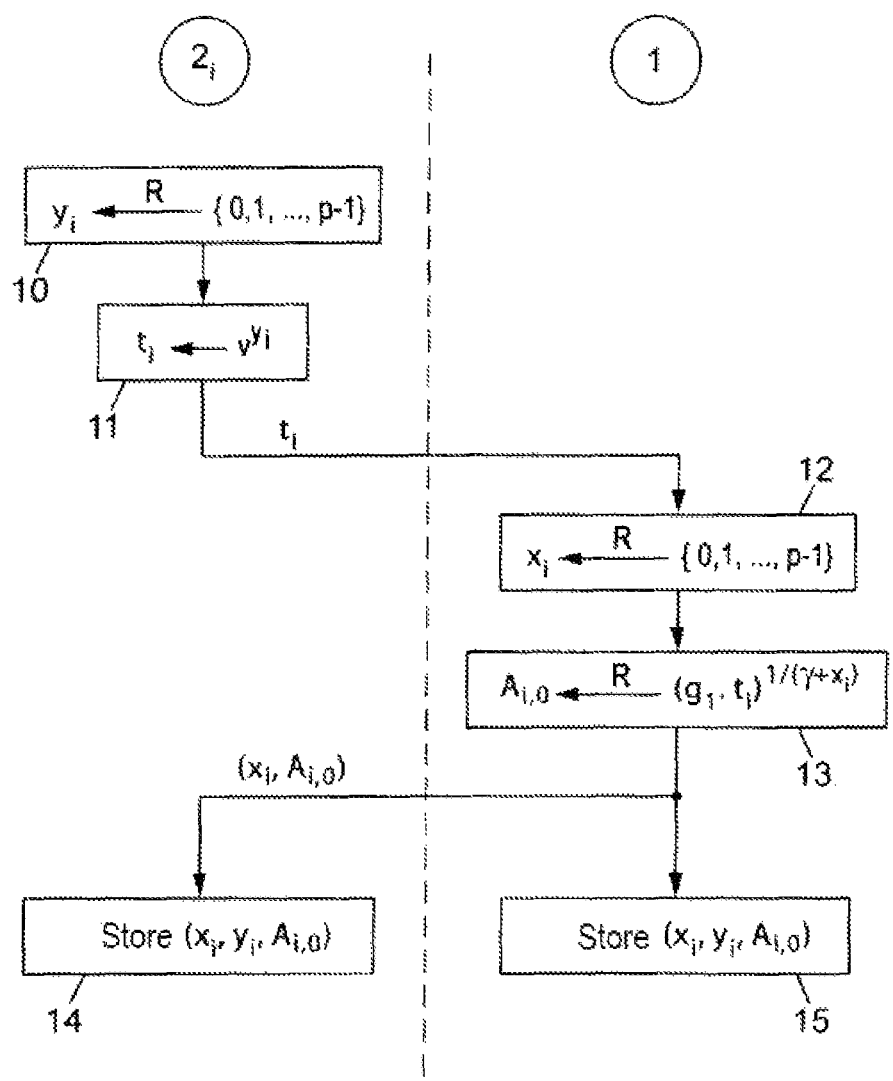
FIG. 10 is a diagram illustrating a procedure for registering the signers in an embodiment of the cryptographic method.

In one variant, $A_{i,0}=g_1^{1/(γ+x_i)} \cdot v^{y_i/(γ+x_i)}$ is used, where the integer $y_i$ is selected by the member i between 0 and p−1 during a registration procedure such as the one illustrated in FIG. 10.

The registration procedure allows the users who are members of the signer group to keep the component $y_i$ and communicate it to no one. In a first step 10, the cryptographic device $2_i$ of the member randomly selects the integer $y_i$ between 0 and p−1, then calculates the element $t_i=v^{x_i}$ of the group $G_1$ in step 11. This element $t_i$ is sent to the supervisory authority 1 in a registration request.

If the registration is accepted by the authority 1, it randomly selects the integer $x_i$ between 0 and p−1 in step 12, then calculates the element $A_{i,0}=(g_1 \cdot t_i)^{1/(γ+x_i)}$ of the group $G_1$ in step 13. The parameters $x_i$, $A_{i,0}$ for the private key of the member are sent to him by the authority 1 so that he/she registers his/her key gsk[i, 0]=$(x_i, y_i, A_{i,0})$ for the period of index j=0 in step 14. He/she will then be able to update it for subsequent periods using recursion (1).

The authority 1 also keeps the element $A_{i,0}$ of the member's key in step 15, and it will be able to update this element $A_{i,j}$ during subsequent periods of index j as dictated by the authority 4 which updates the revocation list.

When a registration procedure is implemented, the procedures for revocation, forming the revocation list for a new period j, and lifting anonymity are identical to those described above with reference to FIGS. 6, 7 and 9. The signature procedure is adapted to take into account the parameter $y_i$ added to the private key. More particularly, the ZKPOK Φ is modified to prove knowledge of the sextuplet $(x_i, y_i, z, α, β, δ)$, where $z=x_i \cdot α$ and $δ=α \cdot β$, such that:

$$T_1=u^α$$

$$e(T_2,g_{2,j})^{x_i} \cdot e(v,w_j)^{-α-y_i} \cdot e(v,g_{2,j})^{-z}=e(g_{1,j},g_{2,j})/e(T_2,w_j)$$

$$T_1^β=u^δ$$

$$S_1=g_{2,j}^β$$

$$e(T_2,h_j)^β=S_2 \cdot e(v,h_j)^δ$$

The ZKPOK thus proves that the cryptogram $T_1=u^α$, $T_2=A_{i,j} \cdot v^α$, $S_1=g_{2,j}^β$, $S_2=e(A_{i,j}, h_j)^β$ is correctly formed with knowledge of the private key gsk[i, j]=$(x_i, y_i, A_{i,j})$ of the member for the signature period of index j. Using standard verification techniques, the verification device 5 is responsible for verifying the ZKPOK for validating the signature σ.

A typical implementation of the cryptographic method consists of equipping the calculators 20, 25, 30, 40, 50 and 60 of the entities 2, 3, 4, 5 and 6 with programs written in appropriate computer languages, which when executed control the calculations and operations described above.

The invention claimed is:

1. A cryptographic method using a cryptographic scheme based on cyclic groups $G_1$, $G_2$ and $G_T$ of order p, two respective generator elements $g_1$ and $g_2$ of groups $G_1$ and $G_2$, and a bilinear map e of $G_1 \times G_2$ onto $G_T$, where p indicates a prime number, time being subdivided into successive periods of index j=0, 1, 2, and successive integers, wherein a public key has components representative of elements u and v of the group $G_1$ and, for each period of index j, components representative of an integer $s_j$ between 0 and p−1, of an element $g_{1,j}$ of the group $G_1$, and of elements $g_{2,j}$, $w_j$ and $h_j$ of the group $G_2$, wherein a first secret key includes an integer γ between 0 and p−1 such that $w_j = g_{2,j}^\gamma$, $g_{1,0} = g_1^{1/(\gamma+s_0)}$, $g_{2,0} = g_2^{1/(\gamma+s_0)}$ and, for j>0, $g_{1,j} = g_{1,j-1}^{1/(\gamma+s_j)}$ and $g_{2,j} = g_{2,j-1}^{1/(\gamma+s_j)}$, wherein a second secret key includes an integer ok between 0 and p−1 such that $v = u^{ok}$, wherein a third secret key includes an integer tk between 0 and p−1 such that $h_j = g_{2,j}^{tk}$, wherein a private key of a member of a signer group has a component representative of an integer $x_i$ between 0 and p−1 and, for each period of index j, a component representative of an element $A_{i,j}$ of the group $G_1$ such that $A_{i,n} = [A_{i,n-1}/g_{1,n-1}]^{1/(x_i-s_n)}$ for any index n between 1 and j, the cryptographic method comprising a signature procedure in which said member of the signer group obtains a signature for a message during a period of index j≧0, by executing on a processor the steps of:

choosing two integers α and β between 0 and p−1;

calculating elements $T_1 = u^\alpha$ and $T_2 = A_{i,j} \cdot v^\alpha$ of the group $G_1$;

calculating an element $S_1 = g_{2,j}^\beta$ of the group $G_2$;

calculating an element $S_2 = e(A_{i,j}, h_j)^\beta$ of the group $G_T$;

calculating, as a function of the message, proof data confirming that the elements $T_1$, $T_2$, $S_1$ and $S_2$ are correctly formed with knowledge of the private key of the member of the signer group for the period of index j; and including the elements $T_1$, $T_2$, $S_1$, $S_2$ and the proof data in the signature of the message.

2. The cryptographic method of claim 1, wherein the element $A_{i,0}$ of the private key of said member for the period of index j=0 is equal to $g_1^{1/(\gamma+x_i)}$.

3. The cryptographic method of claim 2, wherein the proof data comprise a zero-knowledge proof of knowledge of a quintuplet $(x_i, z, \alpha, \beta, \delta)$ where $z = x_i \cdot \alpha$ and $\delta = \alpha \cdot \beta$ such that:

$$T_1 = u^\alpha;$$

$$e(T_2, g_{2,j})^{x_i} \cdot e(v, w_j)^{-\alpha} \cdot e(v, g_{2,j})^{-z} = e(g_{1,j}, g_{2,j})/e(T_2, w_j);$$

$$T_1^\beta = u^\delta;$$

$$S_1 = g_{2,j}^\beta; \text{ and}$$

$$e(T_2, h_j)^\beta = S_2 \cdot e(v, h_j)^\delta.$$

4. The cryptographic method of claim 1, further comprising a procedure for registering members with a supervisory authority holding the secret first key, wherein the private key of a member of a signer group further has a component representative of another integer $y_i$ between 0 and p−1, wherein registration of said member of the signer group comprises:

selecting, by said member, the integer $y_i$ between 0 and p−1;

calculating, by said member, an element $t_i = v^{x_i}$ of the group $G_1$;

sending the element $t_i$ from said member to the supervisory authority;

selecting, by the supervisory authority, the integer $x_i$ between 0 and p−1;

calculating, by the supervisory authority, the element $A_{i,0} = (g_1 \cdot t_i)^{1/(\gamma+x_i)}$ of the group $G_1$; and sending the integer $x_i$ and the element $A_{i,0}$ from the supervisory authority to said member.

5. The cryptographic method of claim 4, wherein the proof data comprise a zero-knowledge proof of knowledge of a sextuplet $(x_i, y_i, z, \alpha, \beta, \delta)$ where $z = x_i \cdot \alpha$ and $\delta = \alpha \cdot \beta$ such that:

$$T_1 = u^\alpha;$$

$$e(T_2, g_{2,j})^{x_i} \cdot e(v, w_j)^{-\alpha-y_i} \cdot e(v, g_{2,j})^{-z} = e(g_{1,j}, g_{2,j})/e(T_2, w_j);$$

$$T_1^\beta = u^\delta;$$

$$S_1 = g_{2,j}^\beta; \text{ and}$$

$$e(T_2, h_j)^\beta = S_2 \cdot e(v, h_j)^\delta.$$

6. The cryptographic method of claim 1, further comprising a procedure for revoking members of the signer group by an authority holding the third secret key and maintaining an updated revocation list applicable to a current period and comprising k−1 elements of the group $G_1$ after revocation of k−1 members of the signer group, where k is an integer at least equal to 1, wherein revocation during a period of index j' of a $k^{th}$ member of the signer group for whom the private key contains an element $A_{i(k),j'}$ of the group $G_1$ for the period of index j' comprises adding an element grt[i(k), j']= $A_{i(k),j'}^{tk}$ of the group $G_1$ to the revocation list applicable to the period of index j'.

7. The cryptographic method of claim 6, further comprising a procedure for modifying the revocation list by an authority holding the first secret key, at each change of period in the time subdivision, wherein modifying the revocation list when advancing from a period of index j''−1 to the next period of index j'' for an integer j''≧1 comprises, for any element grt[i(l), j''−1] of the group $G_1$ belonging to the revocation list applicable to the period of index j''−1, including the element grt[i(l), j'']=grt[i(l), j''−1]$^{1/(\gamma+s_{j''})}$ of the group $G_1$ into the revocation list applicable to the next period of index j''.

8. The cryptographic method of claim 7, further comprising a signature verification procedure by an entity holding the public key, taking into account the revocation list applicable to a signature period, wherein verifying a signature, including elements $T_1$, $T_2$ of the group $G_1$ and $S_1$, $S_2$ of the group $G_2$ and proof data, attached to a message and presumed to be obtained during a period of index j, takes into account the revocation list applicable to the period of index j and comprises the steps of:

determining that the signature comes from a member of the signer group if the proof data confirm that the elements $T_1$, $T_2$, $S_1$ and $S_2$ are correctly formed as a function of the message with knowledge of a private key valid for the period of index j; and accepting the signature as coming from a non-revoked member of the signer group if $e(grt[i(l), j], S_1) \neq S_2$ for any element grt[i(l), j] of the revocation list applicable to the period of index j.

9. The cryptographic method of claim 1, further comprising a procedure for lifting anonymity of a signer of a message by an authority holding the second secret key, wherein lifting anonymity based on a signature of the message, including elements $T_1$, $T_2$ of the group $G_1$, comprises calculating an element $A = T_2 \cdot T_1^{-ok}$ of the group $G_1$.

10. A cryptographic device, using a cryptographic scheme based on cyclic groups $G_1$, $G_2$ and $G_T$ of order p, two respective generating elements $g_1$ and $g_2$ of the groups $G_1$ and $G_2$, and a bilinear map e of $G_1 \times G_2$ onto $G_T$, where p indicates a prime number, time being subdivided into successive periods of index j=0, 1, 2, and successive integers,
  wherein a public key has components representative of elements u and v of the group $G_1$ and, for each period of index j, components representative of an integer $s_j$ between 0 and p−1, of an element $g_{1,j}$ of the group $G_1$, and of elements $g_{2,j}$, $w_j$ and $h_j$ of the group $G_2$,
  wherein a private key of a member of a signer group possessing said cryptographic device has a component representative of an integer $x_i$ between 0 and p−1 and, for each period of index j, a component representative of an element $A_{i,j}$ of the group $G_1$ such that $A_{i,n} = [A_{i,n-1}/g_{1,n-1}]^{1/(x_i-s_n)}$ for any index n between 1 and j,
  the cryptographic device comprising a hardware processor and instructions for obtaining a signature for a message during a period of index j≧0, by selecting two integers α and β between 0 and p−1, and calculating elements $T_1 = u^\alpha$ and $T_2 = A_{i,j} \cdot v^\alpha$ of the group $G_1$, an element $S_1 = g_{2,j}^\beta$ of the group $G_2$, an element $S_2 = e(A_{i,j}, h_j)^\beta$ of the group $G_T$ and, as a function of the message, proof data confirming that the elements $T_1$, $T_2$, $S_1$ and $S_2$ are correctly formed with knowledge of the private key of the member of the signer group for the period of index j,
  the signature of the message including the elements $T_1$, $T_2$, $S_1$, $S_2$ and the proof data.

11. A cryptographic device, using a cryptographic scheme based on cyclic groups $G_1$, $G_2$ and $G_T$ of order p, two respective generating elements $g_1$ and $g_2$ of the groups $G_1$ and $G_2$, and a bilinear map e of $G_1 \times G_2$ onto $G_T$, where p indicates a prime number, time being subdivided into successive periods of index j=0, 1, 2, and successive integers,
  wherein a public key has components representative of elements u and v of the group $G_1$ and, for each period of index j, components representative of an integer $s_j$ between 0 and p−1, of an element $g_{1,j}$ of the group $G_1$, and of elements $g_{2,j}$, $w_j$ and $h_j$ of the group $G_2$,
  wherein a secret key includes an integer tk between 0 and p−1 such that $h_j = g_{2,j}^{tk}$,
  wherein a private key of a member of a signer group has a component representative of an integer $x_i$ between 0 and p−1 and, for each period of index j, a component representative of an element $A_{i,j}$ of the group $G_1$ such that $A_{i,n} = [A_{i,n-1}/g_{1,n-1}]^{1/(x_i-s_n)}$ for any index n between 1 and j, said member of the signer group being able to generate a signature for a message during a period of index j≧0, the signature including elements $T_1 = u^\alpha$ and $T_2 = A_{i,j} \cdot v^\alpha$ of the group $G_1$, an element $S_1 = g_{2,j}^\beta$ of the group $G_2$, an element $S_2 = e(A_{i,j}, h_j)^\beta$ of the group $G_T$, and proof data dependent on the message and confirming that the elements $T_1$, $T_2$, $S_1$ and $S_2$ were correctly formed with knowledge of the private key of said member for the period of index j, α and β being two integers between 0 and p−1 selected by said member,
  the cryptographic device comprising a hardware processor and revocation manager instructions for maintaining an updated revocation list applicable to a current period using said secret key, the revocation manager instructions comprising calculator instructions for receiving, during a period of index j', a revocation list comprising k−1≧0 elements of the group $G_1$ and a revocation request for a $k^{th}$ member of the signer group for whom the private key comprises an element $A_{i(k),j'}$ of the group $G_1$ for the period of index j', where k is an integer at least equal to 1, and for producing an updated revocation list applicable to the period of index j', to which has been added an element $grt[i(k), j'] = A_{i(k),j'}^{tk}$ of the group $G_1$.

12. A cryptographic device, using a cryptographic scheme based on cyclic groups $G_1$, $G_2$ and $G_T$ of order p, two respective generating elements $g_1$ and $g_2$ of the groups $G_1$ and $G_2$, and a bilinear map e of $G_1 \times G_2$ onto $G_T$, where p indicates a prime number, time being subdivided into successive periods of index j=0, 1, 2, and successive integers,
  wherein a public key has components representative of elements u and v of the group $G_1$ and, for each period of index j, components representative of an integer $s_j$ between 0 and p−1, of an element $g_{1,j}$ of the group $G_1$, and of elements $g_{2,j}$, $w_j$ and $h_j$ of the group $G_2$,
  wherein a secret key includes an integer γ between 0 and p−1 such that $w_j = g_{2,j}^\gamma$, $g_{1,0} = g_1^{1/(\gamma+s_0)}$, $g_{2,0} = g_2^{1/(\gamma+s_0)}$ and, for j>0, $g_{1,j} = g_{1,j-1}^{1/(\gamma+s_j)}$ and $g_{2,j} = g_{2,j-1}^{1/(\gamma+s_j)}$,
  wherein a private key of a member of a signer group has a component representative of an integer $x_i$ between 0 and p−1 and, for each period of index j, a component representative of an element $A_{i,j}$ of the group $G_1$ such that $A_{i,n} = [A_{i,n-1}/g_{1,n-1}]^{1/(x_i-s_n)}$ for any index n between 1 and j, said member of the signer group being able to generate a signature for a message during a period of index j≧0, the signature including elements $T_1 = u^\alpha$ and $T_2 = A_{i,j} \cdot v^\alpha$ of the group $G_1$, an element $S_1 = g_{2,j}^\beta$ of the group $G_2$, an element $S_2 = e(A_{i,j}, h_j)^\beta$ of the group $G_T$, and proof data dependent on the message and confirming that the elements $T_1$, $T_2$, $S_1$ and $S_2$ were correctly formed with knowledge of the private key of said member for the period of index j, where α and β are two integers between 0 and p−1 selected by said member,
  the cryptographic device comprising a hardware processor and revocation list manager instructions for forming a revocation list applicable to a new period of index j" using said secret key and based on a revocation list applicable to the previous period of index j"−1, where j" is an integer at least equal to 1, the revocation list applicable to the new period of index j" comprising a respective element $grt[i(l), j"] = grt[i(l), j"-1]^{1/(\gamma+s_{j"})}$ of the group $G_1$ for any element $grt[i(l), j"-1]$ of the group $G_1$ belonging to the revocation list applicable to the previous period of index j"−1.

13. A verification device for verifying signatures produced using a cryptographic scheme based on cyclic groups $G_1$, $G_2$ and $G_T$ of order p, two respective generator elements $g_1$ and $g_2$ of the groups $G_1$ and $G_2$, and a bilinear map e of $G_1 \times G_2$ onto $G_T$, where p indicates a prime number, time being subdivided into successive periods of index j=0, 1, 2, and successive integers,
  wherein a public key has components representative of elements u and v of the group $G_1$ and, for each period of index j, components representative of an integer $s_j$ between 0 and p−1, of an element $g_{1,j}$ of the group $G_1$, and of elements $g_{2,j}$, $w_j$ and $h_j$ of the group $G_2$,
  wherein a private key of a member of a signer group (2) has a component representative of an integer $x_i$ between 0 and p−1 and, for each period of index j, a component representative of an element $A_{i,j}$ of the group $G_1$ such that $A_{i,n} = [A_{i,n-1}/g_{1,n-1}]^{1/(x_i-s_n)}$ for any index n between 1 and j, said member of the signer group being able to generate a signature for a message during a period of index j≧0, said signature including elements $T_1 = u^\alpha$ and $T_2 = A_{i,j} \cdot v^\alpha$ of the group $G_1$, an element $S_1 = g_{2,j}^\beta$ of the group $G_2$, an element $S_2 = e(A_{i,j}, h_j)^\beta$ of the group $G_T$, and proof data dependent on the message and confirming that the elements $T_1$, $T_2$, $S_1$ and $S_2$ were correctly formed with knowledge of the private key of said member for the period of index j, where α and β are two integers between 0 and p−1 selected by said member, the verification device having access to the public key for a period of index j as well as to a revocation list applicable to the period of index j and composed of k elements grt[i(l), j] of the group $G_1$, where k is a non-negative integer, the verification device comprising a hardware processor and calculator instructions for receiving a signature, including elements $T_1$, $T_2$ of the group $G_1$ and $S_1$, $S_2$ of the group $G_2$, and proof data, attached to a message and presumed to be obtained during a period of index j, for determining that said signature comes from a member of the signer group if the proof data confirm that the elements $T_1$, $T_2$, $S_1$ and $S_2$ are correctly formed as a function of the message with knowledge of a private key valid for the period of index j, and for accepting the signature as coming from a non-revoked member of the signer group if $e(grt[i(l), j], S_1) \neq S_2$ for every element grt[i(l),j] of the revocation list applicable to the period of index j.

14. A cryptographic device, using a cryptographic scheme based on cyclic groups $G_1$, $G_2$ and $G_T$ of order p, two respective generator elements $g_1$ and $g_2$ of the groups $G_1$ and $G_2$, and a bilinear map e of $G_1 \times G_2$ onto $G_T$, where p indicates a prime number, time being subdivided into successive periods of index j=0, 1, 2, and successive integers, wherein a public key has components representative of elements u and v of the group $G_1$ and, for each period of index j, components representative of an integer $s_j$ between 0 and p−1, of an element $g_{1,j}$ of the group $G_1$, and elements $g_{2,j}$, $w_j$ and $h_j$ of the group $G_2$, wherein a secret key includes an integer ok between 0 and p−1 such that $v=u^{ok}$, wherein a private key of a member of a signer group has a component representative of an integer $x_i$ between 0 and p−1 and, for each period of index j, a component representative of an element $A_{i,j}$ of the group $G_1$ such that $A_{i,n}=[A_{i,n-1}/g_{i,n-1}]^{1/(x_i-s_n)}$ for any index n between 1 and j, said member of the signer group being able to generate a signature for a message during a period of index j≧0, said signature including elements $T_1=u^\alpha$ and $T_2=A_{i,j} \cdot v^\alpha$ of the group $G_1$, an element $S_1=g_{2,j}^\beta$ of the group $G_2$, an element $S_2=e(A_{i,j}, h_j)^\beta$ of the group $G_T$, and proof data dependent on the message and confirming that the elements $T_1$, $T_2$, $S_1$ and $S_2$ were correctly formed with knowledge of the private key of said member for the period of index j, where α and β are two integers between 0 and p−1 selected by said member, the cryptographic device comprising a hardware processor and an anonymity lifting server using said secret key, for receiving a signature of a message, including elements $T_1$, $T_2$ of the group $G_1$, and producing an element $A=T_2 \cdot T_1^{-ok}$ of the group $G_1$.

15. A non-transitory computer-readable medium having a computer program stored thereon for a cryptographic device used by a member of a signer group, the program comprising instructions for executing a signature procedure of a cryptographic method when the program is executed by a processing unit of the cryptographic device, wherein the cryptographic method comprises a cryptographic scheme based on cyclic groups $G_1$, $G_2$ and $G_T$ of order p, two respective generator elements $g_1$ and $g_2$ of groups $G_1$ and $G_2$, and a bilinear map e of $G_1 \times G_2$ onto $G_T$, where p indicates a prime number, time being subdivided into successive periods of index j=0, 1, 2, and successive integers, wherein a public key of the cryptographic scheme has components representative of elements u and v of the group $G_1$ and, for each period of index j, components representative of an integer $s_j$ between 0 and p−1, of an element $g_{1,j}$ of the group $G_1$, and of elements $g_{2,j}$, $w_j$ and $h_j$ of the group $G_2$, wherein a first secret key of the cryptographic scheme includes an integer γ between 0 and p−1 such that $w_j=g_{2,j}^\gamma$, $g_{1,0}=g_1^{1/(\gamma+s_0)}$, $g_{2,0}=g_2^{1/(\gamma+s_0)}$ and, for j>0, $g_{1,j}=g_{1,j-1}^{1/(\gamma+s_j)}$ and $g_{2,j}=g_{2,j-1}^{1/(\gamma+s_j)}$, wherein a second secret key of the cryptographic scheme includes an integer ok between 0 and p−1 such that $v=u^{ok}$, wherein a third secret key of the cryptographic scheme includes an integer tk between 0 and p−1 such that $h_j=g_{2,j}^{tk}$, wherein a private key of said member of the signer group has, in the cryptographic scheme, a component representative of an integer $x_i$ between 0 and p−1 and, for each period of index j, a component representative of an element $A_{i,j}$ of the group $G_1$ such that $A_{i,n}=[A_{i,n-1}/g_{i,n-1}]^{1/(x_i-s_n)}$ for index n between 1 and or any j, wherein the signature procedure comprises obtaining a signature for a message during a period of index j≧0, by:

choosing two integers α and β between 0 and p−1;

calculating elements $T_1=u^\alpha$ and $T_2=A_{i,j} \cdot v^\alpha$ of the group $G_1$;

calculating an element $S_1=g_{2,j}^\beta$ of the group $G_2$;

calculating an element $S_2=e(A_{i,j}, h_j)^\beta$ of the group $G_T$;

calculating, as a function of the message, proof data confirming that the elements $T_1$, $T_2$, $S_1$ and $S_2$ are correctly formed with knowledge of the private key of the member of the signer group for the period of index j; and including the elements $T_1$, $T_2$, $S_1$, $S_2$ and the proof data in the signature of the message.

16. A non-transitory computer-readable medium having a computer program stored thereon for a cryptographic unit used by a revocation authority for revoking membership from a signer group, the program comprising instructions for executing a revocation procedure of a cryptographic method when the program is executed by a processing unit of the cryptographic unit, wherein the cryptographic method comprises a cryptographic scheme based on cyclic groups $G_1$, $G_2$ and $G_T$ of order p, two respective generator elements $g_1$ and $g_2$ of groups $G_1$ and $G_2$, and a bilinear map e of $G_1 \times G_2$ onto $G_T$, where p indicates a prime number, time being subdivided into successive periods of index j=0, 1, 2, and successive integers, wherein a public key of the cryptographic scheme has components representative of elements u and v of the group $G_1$ and, for each period of index j, components representative of an integer $s_j$ between 0 and p−1, of an element $g_{1,j}$ of the group $G_1$, and of elements $g_{2,j}$, $w_j$ and $h_j$ of the group $G_2$, wherein a first secret key of the cryptographic scheme includes an integer γ between 0 and p−1 such that $w_j=g_{2,j}^\gamma$, $g_{1,0}=g_1^{1/(\gamma+s_0)}$, $g_{2,0}=g_2^{1/(\gamma+s_0)}$ and, for j>0, $g_{1,j}=g_{1,j-1}^{1/(\gamma+s_j)}$ and $g_{2,j}=g_{2,j-1}^{1/(\gamma+s_j)}$, wherein a second secret key of the cryptographic scheme includes an integer ok between 0 and p−1 such that $v=u^{ok}$, wherein a third secret key of the cryptographic scheme is held by the revocation authority and includes an integer tk between 0 and p−1 such that $h_j=g_{2,j}^{tk}$, wherein a private key of a member of a signer group has, in the cryptographic scheme, a component representative of an integer $x_i$ between 0 and p−1 and, for each period of index j, a component representative of an element $A_{i,j}$ of the group $G_1$ such that $A_{i,n}=[A_{i,n-1}/g_{i,n-1}]^{1/(x_i-s_n)}$ for any index n between 1 and j, the cryptographic method further comprising a signature procedure in which said member of the signer group obtains a signature for a message during a period of index $j \geqq 0$, by executing the steps of:

choosing two integers α and β between 0 and p−1;

calculating elements $T_1=u^\alpha$ and $T_2=A_{i,j} \cdot v^\alpha$ of the group $G_1$;

calculating an element $S_1=g_{2,j}{}^\beta$ of the group $G_2$;

calculating an element $S_2=e(A_{i,j}, h_j)^\beta$ of the group $G_T$;

calculating, as a function of the message, proof data confirming that the elements $T_1$, $T_2$, $S_1$ and $S_2$ are correctly formed with knowledge of the private key of the member of the signer group for the period of index j; and including the elements $T_1$, $T_2$, $S_1$, $S_2$ and the proof data in the signature of the message, wherein the revocation procedure is for maintaining an updated revocation list applicable to a current period and comprising k−1 elements of the group $G_1$ after revocation of k−1 members of the signer group, where k is an integer at least equal to 1, and wherein the revocation procedure comprises, for revoking during a period of index j' a $k^{th}$ member of the signer group for whom the private key contains an element $A_{i(k),j'}$ of the group $G_1$ for the period of index j', adding an element grt[i(k), j']=$A_{i(k),j'}{}^{tk}$ of the group $G_1$ to the revocation list applicable to the period of index j'.

17. A non-transitory computer-readable medium having a computer program stored thereon for a cryptographic unit used by a revocation list modification authority for modifying a revocation list of members of a signer group, the program comprising instructions for a revocation list modification procedure of a cryptographic method when the program is executed by a processing unit of the cryptographic unit, wherein the cryptographic method comprises a cryptographic scheme based on cyclic groups $G_1$, $G_2$ and $G_T$ of order p, two respective generator elements $g_1$ and $g_2$ of groups $G_1$ and $G_2$, and a bilinear map e of $G_1 \times G_2$ onto $G_T$, where p indicates a prime number, time being subdivided into successive periods of index j=0, 1, 2, and successive integers, wherein a public key of the cryptographic scheme has components representative of elements u and v of the group $G_1$ and, for each period of index j, components representative of an integer $s_j$ between 0 and p−1, of an element $g_{1,j}$ of the group $G_1$, and of elements $g_{2,j}$, $w_j$ and $h_j$ of the group $G_2$, wherein a first secret key of the cryptographic scheme is held by the revocation list modification authority and includes an integer γ between 0 and p−1 such that $w_j=g_{2,j}{}^\gamma$, $g_{1,0}=g_1{}^{1/(\gamma+s_0)}$, $g_{2,0}=g_2{}^{1/(\gamma+s_0)}$ and, for j>0, $g_{1,j}=g_{1,j-1}{}^{1/(\gamma+s_j)}$ and $g_{2,j}=g_{2,j-1}{}^{1/(\gamma+s_j)}$, wherein a second secret key of the cryptographic scheme includes an integer ok between 0 and p−1 such that $v=u^{ok}$, wherein a third secret key of the cryptographic scheme is held by a revocation authority and includes an integer tk between 0 and p−1 such that $h_j=g_{2,j}{}^{tk}$, wherein a private key of a member of a signer group has, in the cryptographic scheme, a component representative of an integer $x_i$ between 0 and p−1 and, for each period of index j, a component representative of an element $A_{i,j}$ of the group $G_1$ such that $A_{i,n}=[A_{i,n-1}/g_{i,n-1}]^{1/(x_i-s_n)}$ for any index n between 1 and j, the cryptographic method further comprising a signature procedure in which said member of the signer group obtains a signature for a message during a period of index $j \geqq 0$, by executing the steps of:

choosing two integers α and β between 0 and p−1;

calculating elements $T_1=u^\alpha$ and $T_2=A_{i,j} \cdot v^\alpha$ of the group $G_1$;

calculating an element $S_1=g_{2,j}{}^\beta$ of the group $G_2$;

calculating an element $S_2=e(A_{i,j}, h_j)^\beta$ of the group $G_T$;

calculating, as a function of the message, proof data confirming that the elements $T_1$, $T_2$, $S_1$ and $S_2$ are correctly formed with knowledge of the private key of the member of the signer group for the period of index j; and including the elements $T_1$, $T_2$, $S_1$, $S_2$ and the proof data in the signature of the message, the cryptographic method further comprising a procedure for revoking members of the signer group by the revocation authority and maintaining an updated revocation list applicable to a current period and comprising k−1 elements of the group $G_1$ after revocation of k−1 members of the signer group, where k is an integer at least equal to 1, wherein revocation during a period of index j' of a $k^{th}$ member of the signer group for whom the private key contains an element $A_{i(k),j'}$ of the group $G_1$ for the period of index j' comprises adding an element grt[i(k), j']=$A_{i(k),j'}{}^{tk}$ of the group $G_1$ to the revocation list applicable to the period of index j', wherein the revocation list modification procedure is for modifying the revocation list by the revocation list modification authority at each change of period in the time subdivision, wherein modifying the revocation list when advancing from a period of index j"−1 to the next period of index j" for an integer $j'' \geqq 1$ comprises, for any element grt[i(l), j"−1] of the group $G_1$ belonging to the revocation list applicable to the period of index j"−1, including the element grt[i(l), j"]=grt[i(l), j"−1]$^{1/(\gamma+s_{j''})}$ of the group $G_1$ into the revocation list applicable to the next period of index j".

18. A non-transitory computer-readable medium having a computer program stored thereon for a signature verification device, the program comprising instructions for executing a signature verification procedure of a cryptographic method when the program is executed by a processing unit of the verification device, wherein the cryptographic method comprises a cryptographic scheme based on cyclic groups $G_1$, $G_2$ and $G_T$ of order p, two respective generator elements $g_1$ and $g_2$ of groups $G_1$ and $G_2$, and a bilinear map e of $G_1 \times G_2$ onto $G_T$, where p indicates a prime number, time being subdivided into successive periods of index j=0, 1, 2, and successive integers, wherein a public key of the cryptographic scheme is accessible to the verification device and has components representative of elements u and v of the group $G_1$ and, for each period of index j, components representative of an integer $s_j$ between 0 and p−1, of an element $g_{1,j}$ of the group $G_1$, and of elements $g_{2,j}$, $w_j$ and $h_j$ of the group $G_2$, wherein a first secret key of the cryptographic scheme is held by a revocation list modification authority and includes an integer γ between 0 and p−1 such that $w_j=g_{2,j}{}^\gamma$, $g_{1,0}=g_1{}^{1/(\gamma+s_0)}$, $g_{2,0}=g_2{}^{1/(\gamma+s_0)}$ and, for j>0, $g_{1,j}=g_{1,j-1}{}^{1/(\gamma+s_j)}$ and $g_{2,j}=g_{2,j-1}{}^{1/(\gamma+s_j)}$, wherein a second secret key of the cryptographic scheme includes an integer ok between 0 and p−1 such that $v=u^{ok}$, wherein a third secret key of the cryptographic scheme is held by a revocation authority and includes an integer tk between 0 and p−1 such that $h_j = g_{2,j}^{tk}$, wherein a private key of a member of a signer group has, in the cryptographic scheme, a component representative of an integer $x_i$ between 0 and p−1 and, for each period of index j, a component representative of an element $A_{i,j}$ of the group $G_1$ such that $A_{i,n} = [A_{i,n-1}/g_{1,n-1}]^{1/(x_i - s_n)}$ for any index n between 1 and j, the cryptographic method further comprising a signature procedure in which said member of the signer group obtains a signature for a message during a period of index $j \geq 0$, by executing the steps of:

choosing two integers $\alpha$ and $\beta$ between 0 and p−1;

calculating elements $T_1 = u^\alpha$ and $T_2 = A_{i,j} \cdot v^\alpha$ of the group $G_1$;

calculating an element $S_1 = g_{2,j}^\beta$ of the group $G_2$;

calculating an element $S_2 = e(A_{i,j}, h_j)^\beta$ of the group $G_T$;

calculating, as a function of the message, proof data confirming that the elements $T_1, T_2, S_1$ and $S_2$ are correctly formed with knowledge of the private key of the member of the signer group for the period of index j; and including the elements $T_1, T_2, S_1, S_2$ and the proof data in the signature of the message, the cryptographic method further comprising a procedure for revoking members of the signer group by the revocation authority and maintaining an updated revocation list applicable to a current period and comprising k−1 elements of the group $G_1$ after revocation of k−1 members of the signer group, where k is an integer at least equal to 1, wherein revocation during a period of index j' of a $k^{th}$ member of the signer group for whom the private key contains an element $A_{i(k),j'}$ of the group $G_1$ for the period of index j' comprises adding an element $grt[i(k), j'] = A_{i(k),j'}^{tk}$ of the group $G_1$ to the revocation list applicable to the period of index j', the cryptographic method further comprising a revocation list modification procedure for modifying the revocation list by the revocation list modification authority at each change of period in the time subdivision, wherein modifying the revocation list when advancing from a period of index j"−1 to the next period of index j" for an integer $j'' \geq 1$ comprises, for any element grt[i(l), j"−1] of the group $G_1$ belonging to the revocation list applicable to the period of index j"−1, including the element $grt[i(l), j''] = grt[i(l), j''-1]^{1/(\gamma + s_{j''})}$ of the group $G_1$ into the revocation list applicable to the next period of index j", wherein the signature verification procedure is for verifying a signature, including elements $T_1, T_2$ of the group $G_1$ and $S_1, S_2$ of the group $G_2$ and proof data, attached to a message and presumed to be obtained during a period of index j, takes into account the revocation list applicable to the period of index j and comprises:

determining that the signature comes from a member of the signer group if the proof data confirm that the elements $T_1, T_2, S_1$ and $S_2$ are correctly formed as a function of the message with knowledge of a private key valid for the period of index j; and accepting the signature as coming from a non-revoked member of the signer group if $e(grt[i(l), j], S_1) \neq S_2$ for any element grt[i(l), j] of the revocation list applicable to the period of index j.

19. A non-transitory computer-readable medium having a computer program stored thereon for a cryptographic unit used by an anonymity lifting authority for lifting anonymity of a signer of a message, the program comprising instructions for executing an anonymity lifting procedure of a cryptographic method when the program is executed by a processing unit of the cryptographic unit, wherein the cryptographic method comprises a cryptographic scheme based on cyclic groups $G_1, G_2$ and $G_T$ of order p, two respective generator elements $g_1$ and $g_2$ of groups $G_1$ and $G_2$, and a bilinear map e of $G_1 \times G_2$ onto $G_T$, where p indicates a prime number, time being subdivided into successive periods of index j=0, 1, 2, and successive integers, wherein a public key of the cryptographic scheme has components representative of elements u and v of the group $G_1$ and, for each period of index j, components representative of an integer $s_j$ between 0 and p−1, of an element $g_{1,j}$ of the group $G_1$, and of elements $g_{2,j}, w_j$ and $h_j$ of the group $G_2$, wherein a first secret key of the cryptographic scheme includes an integer $\gamma$ between 0 and p−1 such that $w_j = g_{2,j}^\gamma$, $g_{1,0} = g_1^{1/(\gamma + s_0)}$, $g_{2,0} = g_2^{1/(\gamma + s_0)}$ and, for j>0, $g_{1,j} = g_{1,j-1}^{1/(\gamma + s_j)}$ and $g_{2,j} = g_{2,j-1}^{1/(\gamma + s_j)}$, wherein a second secret key of the cryptographic scheme is held by the anonymity lifting authority and includes an integer ok between 0 and p−1 such that $v = u^{ok}$, wherein a third secret key of the cryptographic scheme includes an integer tk between 0 and p−1 such that $h_j = g_{2,j}^{tk}$, wherein a private key of a member of a signer group has, in the cryptographic scheme, a component representative of an integer $x_i$ between 0 and p−1 and, for each period of index j, a component representative of an element $A_{i,j}$ of the group $G_1$ such that $A_{i,n} = [A_{i,n-1}/g_{1,n-1}]^{1/(x_i - s_n)}$ for any index n between 1 and j, the cryptographic method further comprising a signature procedure in which said member of the signer group obtains a signature for a message during a period of index $j \geq 0$, by executing the steps of:

choosing two integers $\alpha$ and $\beta$ between 0 and p−1;

calculating elements $T_1 = u^\alpha$ and $T_2 = A_{i,j} \cdot v^\alpha$ of the group $G_1$;

calculating an element $S_1 = g_{2,j}^\beta$ of the group $G_2$;

calculating an element $S_2 = e(A_{i,j}, h_j)^\beta$ of the group $G_T$;

calculating, as a function of the message, proof data confirming that the elements $T_1, T_2, S_1$ and $S_2$ are correctly formed with knowledge of the private key of the member of the signer group for the period of index j; and including the elements $T_1, T_2, S_1, S_2$ and the proof data in the signature of the message, wherein the anonymity lifting procedure for lifting anonymity based on a signature including elements $T_1, T_2$ of the group $G_1$ comprises calculating an element $A = T_2 \cdot T_1^{-ok}$ of the group $G_1$.

* * * * *